United States Patent [19]

Hamilton

[11] Patent Number: 5,791,838

[45] Date of Patent: Aug. 11, 1998

[54] METAL DRILLING TOOL AND METHOD

[76] Inventor: Martin N. Hamilton, 15219 Middle Rd., Meadville, Pa. 16335

[21] Appl. No.: 758,485

[22] Filed: Nov. 29, 1996

[51] Int. Cl.$^6$ .................................................. B23B 51/00
[52] U.S. Cl. .............................. 408/224; 408/1 R; 408/83; 408/223
[58] Field of Search ............................ 408/224, 223, 408/227, 83, 1 R

[56] References Cited

U.S. PATENT DOCUMENTS

| | | | |
|---|---|---|---|
| 3,303,728 | 2/1967 | Testa | 77/58 |
| 3,643,310 | 2/1972 | Kilbourne et al. | 29/105 |
| 3,966,349 | 6/1976 | Osman et al. | 408/227 |
| 4,033,018 | 7/1977 | Bloink | 29/105 A |
| 4,108,567 | 8/1978 | Faber | 408/224 |
| 4,124,328 | 11/1978 | Hopkins | 408/223 |
| 4,201,500 | 5/1980 | Kralowetz et al. | 407/43 |
| 4,210,406 | 7/1980 | Berry, Jr. | 408/223 |
| 4,230,429 | 10/1980 | Eckle | 408/186 |
| 4,303,358 | 12/1981 | Grusa | 408/223 |
| 4,565,471 | 1/1986 | Negishi et al. | 408/204 |
| 4,642,001 | 2/1987 | Gill et al. | 408/59 |
| 4,676,702 | 6/1987 | Reinauer | 408/144 |
| 4,889,455 | 12/1989 | Karlsson et al. | 408/224 |
| 4,968,192 | 11/1990 | Hamilton | 408/144 |
| 4,984,943 | 1/1991 | Hamilton | 408/144 |
| 5,328,304 | 7/1994 | Kress et al. | 408/83 |
| 5,478,178 | 12/1995 | Pawlick | 408/227 |
| 5,551,812 | 9/1996 | Basteck | 408/83 |
| 5,649,794 | 7/1997 | Kress et al. | 408/83 |

FOREIGN PATENT DOCUMENTS

| | | | |
|---|---|---|---|
| 2903814 | 8/1980 | Germany | 408/224 |
| 99287 | 8/1979 | Japan | 408/223 |
| 2230429 | 1/1974 | Netherlands. | |
| 479355 | 4/1992 | Spain | 408/223 |

*Primary Examiner*—Daniel W. Howell
*Assistant Examiner*—Adesh Bhargava
*Attorney, Agent, or Firm*—Charles L. Lovercheck; Wayne L. Lovercheck

[57] ABSTRACT

A drilling tool having a cylindrical body with a central axis. A first cutting insert with a cutting edge extending from a datum plane from a position about half way between the central axis and the outer edge of the holes and extending toward the first end of the tool at a first acute angle and a second cutting insert extending from the datum plane extending generally outwardly at a second acute angle substantially less than the first acute angle so that the cutting path of the second insert intersects the cutting path of the first insert whereby four chips are cut by the cutting tool.

12 Claims, 1 Drawing Sheet

5,791,838

METAL DRILLING TOOL AND METHOD

BACKGROUND OF THE INVENTION

When drilling deep holes (depth four times the diameter or greater), the problem has always been how to make a chip of a configuration which can be flushed from the cutting area of the tool without injury of the tool, machine or the operation. The tool design disclosed herein solves the problem with the industry standard replacement inserts with great drilling speed and accuracy.

A drilling tool is disclosed having a hollow cylindrical body having a central axis with a drive means on one end, and a means for supporting cutting inserts on the other end. The cutting inserts are arranged to cut in groups of two or more. Each insert has at least one generally straight cutting edge. The second insert of each group is disposed at a cutting angle whereby the path of the cutting edge of the first insert will extend to the wall of the hole from a position spaced from the central axis and the cutting edge of the second insert will extend from the central axis of the hole and intersect the path of the cutting edge of the first insert whereby four chips will be formed.

REFERENCE TO PRIOR ART

Applicant is aware of the following U.S. Pat. Nos. 3,303,728; 3,643,310; 4,033,018; 4,108,567; 4,124,328; 4,201,500; 4,230,429; 4,303,358; 4,565,471; 4,642,001; 4,676,702; 4,968,192; and, 4,984,943. Applicant also notes Dutch Patent No. 2,230,429.

SUMMARY OF THE INVENTION

It is an object of the present invention to provide a tool to drill, small (1.250 diameter and smaller) deep holes with a depth of over four times the diameter.

It is another object of the present invention to provide an improved drilling tool.

It is another object of the present invention to provide an improved drilling tool with replaceable parts for holes of a depth four times their diameter or greater, that reduces the chip size.

It is another object of the present invention to provide a metal drilling tool that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
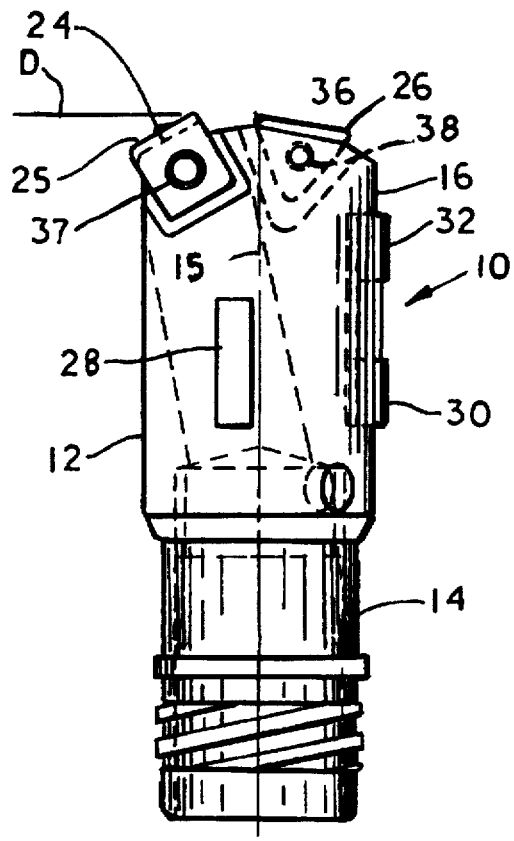
FIG. 1 is a side view of the tool according to the invention.
Figure 2:
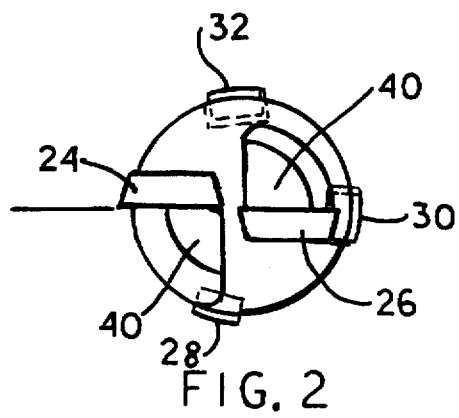
FIG. 2 is an end view of the tool shown in FIG. 1.

Now with more particular reference to the drawings, drilling tool 10 has cylindrical body 12, first cutting insert 24 and second cutting insert 26 for drilling holes in work pieces. Each tool having central axis 15 and datum plane D generally perpendicular to central axis 15. Cylindrical body 12 has first end 14 which is adapted to be connected to a drive means and second end 16 and has tool supporting means 37,38 to support first cutting insert 24 and second cutting insert 26. Chip chutes 40 are formed in body 12.

First cutting insert 24 may be square or triangular and has at least one generally straight cutting edges 25 which may meet at radius 23 at each of its corners. Straight cutting edge 25 of peripheral cutting insert 24 extends radially outwardly from a position spaced from central axis 15 and on datum plane D to outer wall 21 at a first acute angle A to datum plane D. Thus, peripheral cutting insert 24 cuts a frustoconical surface extending from datum plane D to wall 21. The frustoconical surface being the bottom part of a conical surface having an apex at C below datum plane D on central axis 15.

Central cutting insert 26 may be triangular or square in shape and has at least one cutting edges 36 joining each other at radius corners 27 and extending from datum plane D on central axis 15 upwardly and at a second acute angle B (for example thirty degrees) to datum plane D so that second insert 26 cuts a conical surface having its apex on central axis 15 and on datum plane D. Cutting edge 36 extends from the apex upwardly at a second acute angle B that is substantially smaller than first acute angle A (for example about four degrees) whereby the chip of second insert 26 intersects the chip cut by first cutting insert 24 at two places so that the chips cut by inserts 24,26 are divided into four pieces.

Peripheral cutting insert 24 is used in the outside diameter cutting position and is supported on the O.D. of the hole by first wear pad 28, second wear pad 30 and third wear pad 32. First wear pad 28 is located 85 degrees clockwise from cutting edge 25 of peripheral cutting insert 24 viewed from first end 14 of the drill. First wear pad 28 supports the cutting pressure from peripheral insert 24.

Second wear pad 30, the size control wear pad, is located 185 degrees clockwise from cutting edge 25 of peripheral cutting insert 24. Third wear pad 32 is located 275 degrees clockwise from cutting edge 25 of first cutting insert 24 (the OD insert) and is a tool stabilizer wear pad for exerting pressure on first wear pad 28 and second wear pad 30 for a smoother cutting action when entering and exiting. Third wear pad 32 also assures that sufficient pressure is exerted in the direction of first wear pad 28 and second wear pad 30 in such a manner as to provide sufficient constant pressure on wear pads 28,30.

Second cutting insert 26 will be positioned in relation to central axis 15 with radius 23 cutting a very small inverted conical surface concentric to central axis 15.

The basic idea is to use the largest replaceable insert possible for strength and for mechanical holding, but the problem with these larger inserts is that they make too large a chip for ease of chip removal from the drilled hole.

Figure 3:
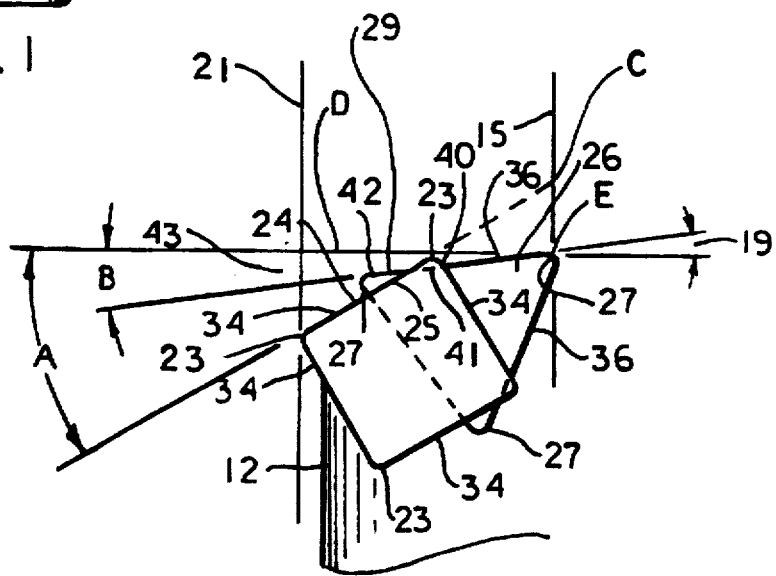
FIG. 3 is a diagrammatic view of the tool shown in FIGS. 1 and 2 showing the inserts overlying one another for better understanding of the invention.

FIG. 3 of the drawing shows that the body 12 has a peripheral insert 24 and a central insert 26 connected to it. Peripheral insert 24 has cutting edges 34. When the drill body rotates the center insert cuts a conical chip with its vertex at E in FIG. 3, and its base at 42. The peripheral insert cuts a frustoconical chip with its top at 23 and its base at 34. The edge of the insert cuts through the first chip and cuts the chip in two, thus four pieces of chips result, one at 36, two at 41, three at 42 and four at 34 as shown in FIG. 3. These four cut chips are much easier to discharge than a single chip would be.

With the above described insert arrangement, applicant uses the largest replaceable insert possible, but provides four chips instead of two which is much easier for chip removal.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A drilling tool for drilling holes in work pieces;

said holes each having a cylindrical wall and a central axis;

a datum plane generally perpendicular to said central axis;

said tool having a generally cylindrical body, having a first end adapted to be connected to a drive means and a second end having means to support a peripheral cutting insert and a central cutting insert;

said peripheral cutting insert and said central cutting insert each having at least one cutting edge having a first end and a second end;

said cutting edge of said peripheral cutting insert extending from a first position on said datum plane between said central axis and said wall and spaced from said central axis and extending upwardly and outwardly substantially toward said wall at a first acute angle for cutting a generally frustoconical chip concentric to said central axis, said cutting edge having a lower end on said datum plane and the other end of said first cutting edge substantially at said cylindrical wall;

said cutting edge of said central cutting insert extending from said datum plane at said central axis upwardly and toward said wall to a second position below said first chip at a second acute angle substantially smaller than said first acute angle for cutting a conical chip with its vertex on said datum plane and its base concentric to said vertical axis whereby said cutting edges cut separate chips.

2. The drilling tool recited in claim 1 wherein said second acute angle is at least three times the size of said first acute angle.

3. The drilling tool recited in claim 2 wherein a wear pad is supported on said body about one hundred eighty-five degrees clockwise from said cutting edge of said first cutting insert comprising a size control wear pad.

4. The drilling tool recited in claim 1 wherein a second wear pad is supported on said body and spaced about one hundred eighty five degrees clockwise from said cutting edge of said first insert for providing smoother cutting action of said first cutting insert and said second cutting insert.

5. The drilling tool recited in claim 1 wherein said peripheral cutting insert is generally square in shape and has at least one cutting edge;

said central cutting insert is generally triangular in shape having at least one cutting edge.

6. The drilling tool recited in claim 1 wherein said body has chip chutes extending from said first end to said second end.

7. The drilling tool recited in claim 1 wherein said cutting edges of said inserts are joined together by a curved surface.

8. The tool recited in claim 1 wherein each of said cutting edges of said inserts terminate in a curved end edge.

9. A method of drilling holes in metal;

said holes having a central axis perpendicular to a datum plane and having a wall;

said method comprising cutting a first chip on said metal concentric to said central axis;

extending said first chip upwardly from said datum plane to said wall at a first angle to said datum plane and concentric to said central axis;

simultaneously cutting a second chip on said metal concentric to said central axis;

extending said chip at a second acute angle substantially smaller than said first acute angle at said central axis whereby said first chip intersects said second chip cutting said chips into four pieces.

10. The method recited in claim 9 wherein said frustoconical surface extends from said datum plane at about half way between said central axis and said wall.

11. The method recited in claim 10 wherein said first angle is about thirty degrees and said second angle is substantially smaller.

12. A drilling tool for drilling holes in a metal work piece;

said holes having a generally cylindrical wall, a central axis and a datum plane;

said tool having a generally cylindrical body, a first end and a second end;

said first end being adapted to have a rotating drive means attached thereto;

a peripheral cutting insert and a central cutting insert attached to said second end of said body;

said peripheral insert and central insert each having at least three cutting edges connected together at three corners;

a cutting edge of said peripheral insert extending from said side wall of said hole toward said central axis and toward said datum plane at a first acute angle cutting a frustoconical chip;

said cutting edge of said central insert extending from said central axis toward said sidewall at a second acute angle for cutting a conical chip concentric to said axis whereby said frustoconical surface intercepts said conical chip cutting said chips into four pieces.

* * * * *